US012542397B2

(12) United States Patent
Vandeplassche et al.

(10) Patent No.: US 12,542,397 B2
(45) Date of Patent: Feb. 3, 2026

(54) HIGH-VOLTAGE ELECTRICAL CONNECTOR FOR THE SPACE SECTOR

(71) Applicant: THALES, Courbevoie (FR)

(72) Inventors: Philippe Vandeplassche, Mont-sur-Marchienne (FR); Alexia Coulon, Mont-sur-Marchienne (FR)

(73) Assignee: THALES, Courbevoie (FR)

( * ) Notice: Subject to any disclaimer, the term of this patent is extended or adjusted under 35 U.S.C. 154(b) by 341 days.

(21) Appl. No.: 18/116,222

(22) Filed: Mar. 1, 2023

(65) Prior Publication Data

US 2023/0283009 A1 Sep. 7, 2023

(30) Foreign Application Priority Data

Mar. 2, 2022 (EP) .................................... 22305238

(51) Int. Cl.
*H01R 13/53* (2006.01)
*H01R 12/72* (2011.01)
*H01R 13/03* (2006.01)

(52) U.S. Cl.
CPC .......... *H01R 13/53* (2013.01); *H01R 12/724* (2013.01); *H01R 13/035* (2013.01)

(58) Field of Classification Search
CPC .. H01R 13/53; H01R 13/035; H01R 13/5227; H01R 12/724

(Continued)

(56) References Cited

U.S. PATENT DOCUMENTS 4,455,056 A * 6/1984 Herrmann, Jr. ........ H01R 13/53 439/732
4,834,678 A * 5/1989 Emadi .................... H01R 13/53 439/744

(Continued)

FOREIGN PATENT DOCUMENTS

EP 665610 A2 * 8/1995 ......... H01R 13/5227
EP 3934027 A1 * 1/2022 ............. H01R 13/40

(Continued)

OTHER PUBLICATIONS

ECSS-E-HB-20-05A—"High voltage engineering and design handbook", pp. 101-219, Dec. 12, 2012.

*Primary Examiner* — Gary F Paumen
(74) *Attorney, Agent, or Firm* — BakerHostetler

(57) ABSTRACT

A high-voltage electrical connector for the space sector, includes a male portion and a female portion, which are intended to produce an electrical contact (CE) between the portions, the male portion comprising: a metallic male external shell; a male dielectric block encapsulated by the male shell and having a male structured region comprising what is called a male recess; the female portion comprising: a metallic female external shell, a female dielectric block encapsulated by the female shell and having a female structured region comprising a female recess; the male or female external shell having at least one opening, the male structured region having a shape that complements a shape of the female structured region, so that the male structured region is capable of being inserted into the female structured region in order to allow the electrical contact and so as to create a leakage duct between the female structured region and the male structured region allowing the air included between the female structured region and the male structured region to flow to the at least one opening.

15 Claims, 6 Drawing Sheets

(58) Field of Classification Search
USPC .......................... 439/205, 206, 187, 181, 186
See application file for complete search history.

(56) References Cited

U.S. PATENT DOCUMENTS

| | | | | | |
|---|---|---|---|---|---|
| 8,075,325 | B1 * | 12/2011 | Kao | H01R 13/5227 438/141 |
| 8,491,323 | B2 * | 7/2013 | Ishibashi | H01R 13/5221 439/271 |
| 9,022,799 | B2 * | 5/2015 | Sorolla Rosario | H01R 13/005 439/578 |
| 2003/0077947 | A1 * | 4/2003 | Sugimori | H01R 13/53 439/686 |
| 2012/0295460 | A1 * | 11/2012 | Ichio | H01R 13/74 439/205 |
| 2013/0143430 | A1 | 6/2013 | Sorolla et al. | |
| 2015/0303613 | A1 * | 10/2015 | Takeshita | H01R 13/631 439/692 |
| 2015/0343914 | A1 * | 12/2015 | Osawa | B60L 53/16 439/205 |
| 2017/0149167 | A1 * | 5/2017 | Ito | H01R 13/5227 |
| 2020/0353830 | A1 | 11/2020 | Duenkel et al. | |

FOREIGN PATENT DOCUMENTS

| | | | | | |
|---|---|---|---|---|---|
| GB | 2362516 | A | * | 11/2001 | H01R 13/5219 |
| WO | WO-2012146765 | A1 | * | 11/2012 | H01R 13/506 |
| WO | WO-2015081064 | A1 | * | 6/2015 | H01R 12/724 |

* cited by examiner

HIGH-VOLTAGE ELECTRICAL CONNECTOR FOR THE SPACE SECTOR

CROSS-REFERENCE TO RELATED APPLICATION

This application claims priority to foreign European patent application No. EP 22305238.2, filed on Mar. 2, 2022, the disclosure of which is incorporated by reference in its entirety.

FIELD OF THE INVENTION

The present invention relates to the field of high-voltage electrical connectors and more particularly to the field of high-voltage electrical connectors for the space sector.

BACKGROUND

In the space sector, high-voltage electrical connectors are known to those skilled in the art. "High-voltage electrical connectors" are understood here and in the remainder of the application to mean connectors that can operate at a voltage greater than 5 kV. It is known practice to produce a high-voltage connector by way of direct wired interconnects that include soldering of the wires in the high-voltage modules and overmoulding of this module in order to produce the electrical insulation.

This technique of interconnection by means of a solid insulator allows the electrical connection to be made robust to the entire range of service pressures from atmospheric pressure to deep vacuum during the mission in orbit.

In spite of this excellent functionality, this technique has several disadvantages:

- This operation needs to be performed by the manufacturer of the EPC or the TWT and requires validation through tests.
- It is not easily reversible and requires what is called a repair mode of operation and forces the tests to be performed again.
- As the EPC and the TWT or TWTs are different objects that will be placed in different thermal zones, handling becomes fairly complex and requires very specific means.

New markets call for the compactness of the satellite to be increased, and this interconnection technique is therefore impossible or very difficult to imagine if the number of TWTs connected to a single EPC needs to be increased.

This is because the fact that the electronic part can be shared in order to supply power to more than two TWTs means that the present solution is inherently limited and poses numerous problems in terms of logistics and in terms of production means. Supplying power to more than two TWTs is particularly critical for producing satellites comprising an active antenna, which advantageously have a very large number of TWTs, thus creating a high level of complexity for the high-voltage interconnect.

In the aeronautical sector, high-voltage electrical connectors are known to those skilled in the art. These connectors are designed to operate over a certain range of altitudes (from sea level to often 33 000 feet or 10 000 m), that is to say for a predetermined pressure range. Typically, aeronautical connectors are made airtight, for example by means of seals around the electrical contact, in order to keep the air trapped between the electrical contacts at atmospheric pressure.

However, this type of connector is not necessarily designed to operate over a very long life (15 years or more) as required in the space sector. This is because, in aeronautics, they will be subject to a maintenance plan that entails maintaining or replacing them. The use of a gasket raises many questions about the behavior of the connector when it is inevitably degassed over a very long period of use. This is because the airtightness is not perfect and necessarily has a micro-leak that will change the internal pressure of the connector.

SUMMARY OF THE INVENTION

The invention aims to overcome certain problems of the prior art. To this end, a subject of the invention is a high-voltage electrical connector for the space sector, comprising a male portion and a female portion that are intended to produce an electrical contact. The connector of the invention is ventilated and has the advantage of allowing the male portion and the female portion to be easily separated. "Ventilated" is understood here and in the remainder of the description to mean that the connector is capable of being pumped so as to achieve a high vacuum (pressure less than 10-6 mbar) or less, particularly in its electrical contact region.

To this end, a subject of the invention is a high-voltage electrical connector for the space sector, comprising a male portion and a female portion, which are intended to produce an electrical contact between the portions, said male portion comprising:

- a metallic male external shell;
- a male dielectric block encapsulated by the male shell and having a male structured region comprising what is called a male recess;
- a male part of the electrical contact that is at least partially embedded in the male dielectric block, said male part extending in a direction x, what is called a male end of said male part being arranged in the male recess, the female portion comprising:
- a metallic female external shell
- a female dielectric block encapsulated by the female shell and having a female structured region comprising a female recess;
- a female part of the electrical contact that is at least partially embedded in the female dielectric block, said female part extending in the direction x, what is called a female end of said female part being arranged in the female recess, said female end being adapted so that said male end is able to interlock with said female end in order to create the electrical contact,
- an assembly formed by said male part, said female part, said male recess and said female recess being called the basic connector,
- the male or female external shell having at least one opening, the male structured region having a shape that complements a shape of the female structured region, so that the male structured region is capable of being inserted into the female structured region, or vice versa, in order to allow the electrical contact and so as to create a leakage duct between the female structured region and the male structured region allowing the air included between the female structured region and the male structured region to flow to said at least one opening.

According to one embodiment of the device of the invention, the leakage duct is the only means for the air included between the female structured region and the male structured region to flow to the outside of said connector.

According to one embodiment of the device of the invention, a portion of the leakage duct in which the electrical contact is arranged extends in the direction x, so that said portion is substantially perpendicular to field lines associated with said electrical contact. Preferably, a thickness of the leakage duct is small enough for there to be no electric breakdown in the air at a pressure of 1 Pa within the leakage duct.

According to one embodiment of the device of the invention, the male structured region is adapted so that what is called a male leakage line between the electrical contact and the male external shell, passing through a surface of the leakage duct that is included in the male dielectric block, has a length greater than a predetermined dielectric breakdown distance associated with said predetermined voltage, at atmospheric pressure, and the female structured region is adapted so that what is called a female leakage line between the electrical contact and the female external shell, passing through a surface of the leakage duct that is included in the female dielectric block, has a length greater than said predetermined dielectric breakdown distance. Preferably, the male leakage line has a length greater than 1.2 cm and the female leakage line has a length greater than 1.2 cm, for a predetermined voltage of 7 kV.

According to one embodiment of the device of the invention, the number of openings and the dimensions of the openings are adapted according to a volume of the leakage duct, so that it is possible to obtain a high vacuum in the leakage duct in a predetermined time.

According to one embodiment of the device of the invention, the male and female recesses are in the form of hollow cylinders.

According to one embodiment of the device of the invention, the device comprises a plurality of basic connectors. Preferably, said basic connectors are arranged so as to form a row or a matrix. Even more preferably, the device comprises a first basic connector and a second basic connector, which are aligned along a direction y perpendicular to x, sharing one and the same leakage duct, and what is called a male intercontact leakage line, between the electrical contact of the first basic connector and the electrical contact of the second basic connector, passing through a surface of the leakage duct that is included in the male dielectric block, has a length greater than a predetermined dielectric breakdown distance, associated with the predetermined voltage, at atmospheric pressure, and what is called a female intercontact leakage line between the electrical contact of the first basic connector and the electrical contact of the second basic connector, passing through a surface of the leakage duct that is included in the female dielectric block, has a length greater than said predetermined breakdown distance

BRIEF DESCRIPTION OF THE DRAWINGS

Other features, details and advantages of the invention will become apparent on reading the description provided with reference to the appended drawings provided by way of example, in which, respectively.

Unless indicated otherwise, the elements in the figures are not to scale.

DETAILED DESCRIPTION

Figure 1A:
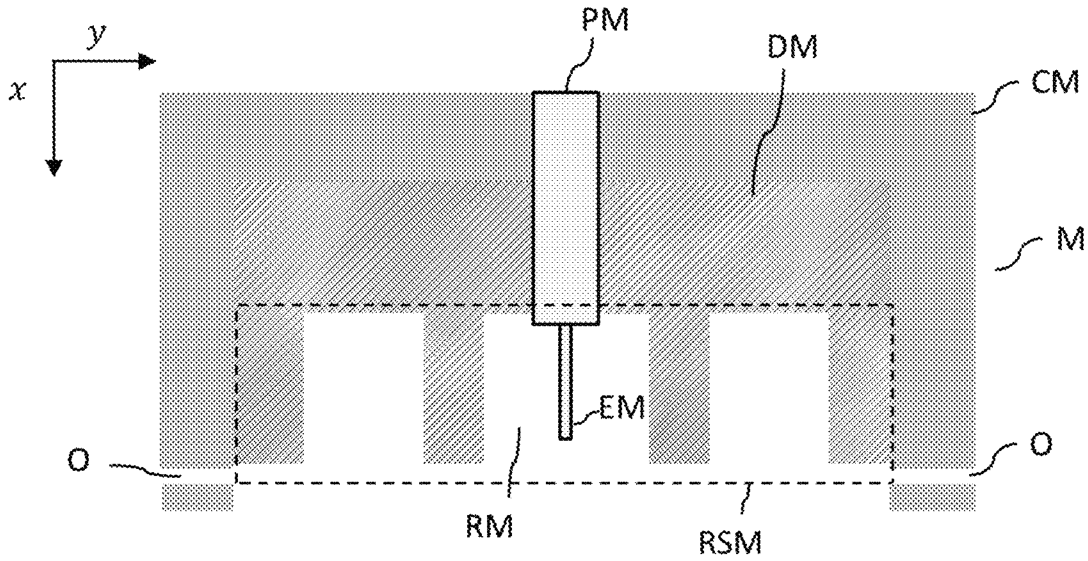
FIG. 1A, FIG. 1B and FIG. 1C show a schematic sectional view along a plane (x, y) of the male portion, the female portion and the connector according to the invention, respectively.
Figure 1B:
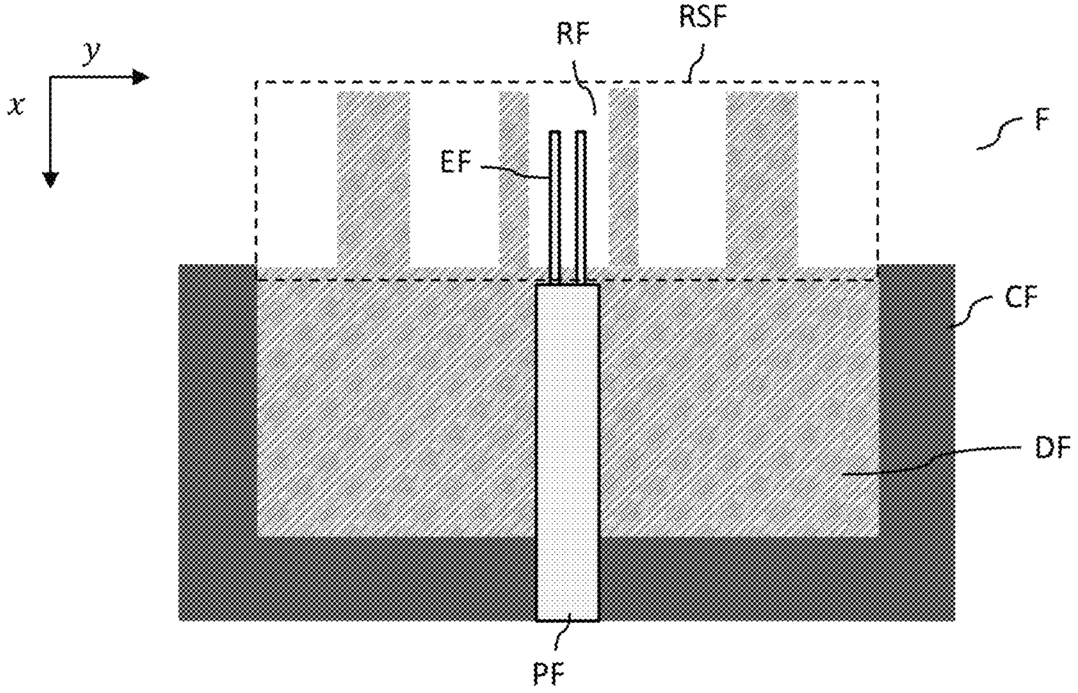
Figure 1C:
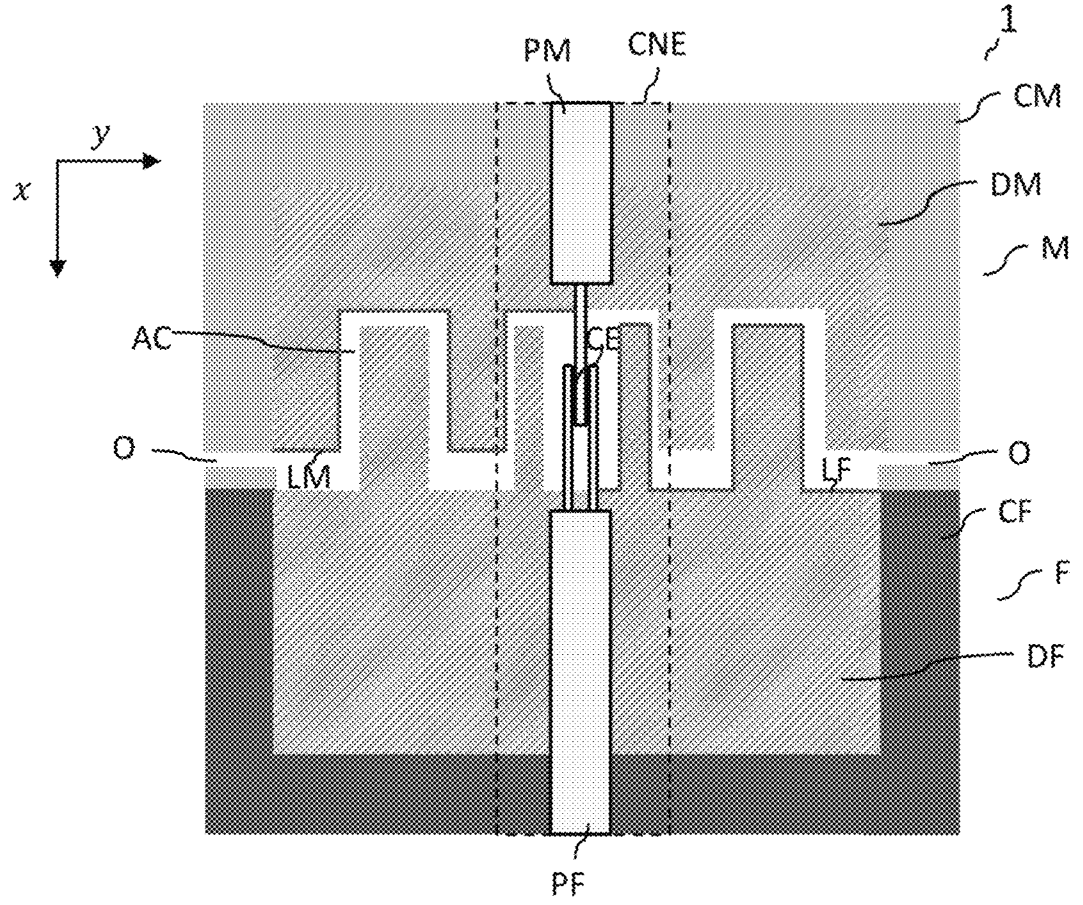

The invention relates to a high-voltage electrical connector 1 for the space sector comprising a male portion M and a female portion F, which are intended to produce an electrical contact CE. FIGS. 1A, 1B and 1C schematically illustrate a sectional view along a plane (x, y) of the male portion M, the female portion F and the connector 1 according to the invention, respectively, with the male portion M and the female portion F plugged in. As will be explained more clearly later on, the connector of the invention is ventilated and allows the male portion and the female portion to be easily separated. Moreover, it is capable of being used at atmospheric pressure and under high vacuum, over a very long life (greater than 15 years). However, it is not operational during depressurization, that is to say while being placed under high vacuum, from an atmospheric pressure and before the high vacuum is achieved.

In the connector of the invention, the male portion M comprises a metal male external shell CM and the female portion F comprises a metal female external shell CF. These shells CM and CF are protective shells known to those skilled in the art.

The male portion M moreover comprises a male dielectric block DM encapsulated by the male shell CM. The block DM is made from polyether ether ketone (also called PEEK), for example, or else from any dielectric materials known to those skilled in the art. The block DM moreover has what is called a male structured region RSM comprising what is called a male recess RM.

Moreover, the male portion M comprises a male part PM of the electrical contact CE that is at least partially embedded in the dielectric block DM. The male part comprises what is called a male end EM, which is arranged in the male recess RM. This male part PM is known to those skilled in the art and is adapted to be connected to a high-voltage power supply (not shown in FIGS. 1A-1C). In the invention, by convention, the male part extends in the direction x.

The portion F itself also comprises a female dielectric block DF that is encapsulated by the female shell CF and has a female structured region RSF comprising a female recess RF. This block DF is itself also an electrical insulator that will be able to be used, by way of its cooperation with the block DM, to ensure proper electrical operation of the connector 1 at atmospheric pressure and under high vacuum.

Moreover, the portion F comprises a female part PF of the electrical contact CE that is at least partially embedded in the female dielectric block DF and extends in the direction x. In order to produce the electrical contact, what is called a female end EF of the female part is arranged in the female recess RF and the female end EF is adapted so that the male end EM is able to interlock with the female end EF in order to create the electrical contact CE. The electrical contact CE is defined as the contact zone between the male end EM and the female end EF. The principle of creating electrical contact from a male end EM and a female end EF that are capable of interlocking with one another is well known to those skilled in the art.

The term basic connector CNE is used to refer to an assembly formed by the male part PM, the female part PF, the male recess RM and the female recess RF.

Essentially, in the connector of the invention, the male external shell CM or female external shell CF has at least one opening O crossing the shell and opening onto the outside of the connector. These openings, which are also called "event holes", can be used to place the connector 1 under high vacuum in order to produce its electrical insulation. By way of illustration, in FIGS. 1A-1C, the shell CM comprises two openings O. Alternatively, according to another embodiment, the shell CM comprises a different number of openings from two.

Finally, in the connector 1, the male structured region RSM has a shape that complements a shape of the female structured region RSF, so that the male structured region is capable of being inserted into the female structured region, or vice versa. Moreover, the two structured regions are configured so as, when inserted into one another, to allow the electrical contact CE and the creation of a leakage duct AC between the female structured region and the male structured region. This duct allows air included between the female structured region and the male structured region to flow to the opening. In the connector, the leakage duct AC is the only means for the air included between the female structured region and the male structured region to flow to the outside of the connector.

It is understood that the interlocking of the male end EM and the female end EF, and the creation of the leakage duct AC, are permitted both by way of the insertion of the regions RSM and RSF but also by way of the cooperation of the male shell CM and the female shell CF. That is to say that the male shell CM and the female shell CF each have a 3D structure that makes it possible to create the duct AC and prevents for example a portion that protrudes from the region RSM from being in contact with the region RSM, which would block the duct AC.

The leakage duct AC of the invention has several advantages:

- it allows the high vacuum to be achieved in the connector and, more precisely, in the leakage duct AC where the electrical contact is arranged. This guarantees electrical insulation for the connector under high vacuum. This is because, in this pressure regime, the mean free path of electrons potentially torn away from the electrical contact CE is too long: there are no longer enough gas atoms on their way to trigger, through collisions with said atoms, the avalanche effect that transforms the gas into plasma and that causes electric breakdown in the air.
- in an atmospheric pressure regime, it can be used to prevent dielectric breakdown between the electrical contact CE and the male external shell CM passing along the surface of the dielectric block DM, on the one hand, and between the electrical contact CE and the female external shell CF passing along the surface of the dielectric block DF. This protects the connector at atmospheric pressure, on the other hand. The term "dielectric breakdown", or "routing", is used here to refer to the process that produces a partially conductive track on the surface of an insulating material following electrical discharges on or close to an insulation surface. Moreover, the duct AC can be used to prevent electric breakdown in the air between the electrical contact CE and the male external shell CM and between the electrical contact CE and the female external shell CF. These features will be explained in detail later on.
- preferably, it allows correct electrical operation (that is to say without creating electric breakdown in the air) of the connector itself during an accidental rise in pressure to 1 Pa. This condition depends specifically on the structure of the portion of the leakage duct in which the electrical contact is arranged (see later on).

The connector of the invention therefore has an ingenious structure that allows the male portion and the female portion to be easily separated and that is capable of being used at atmospheric pressure and under high vacuum over a very long life (greater than 15 years). It is therefore particularly suited to producing satellites comprising an active antenna having a very large number of TWTs.

Figure 1D:
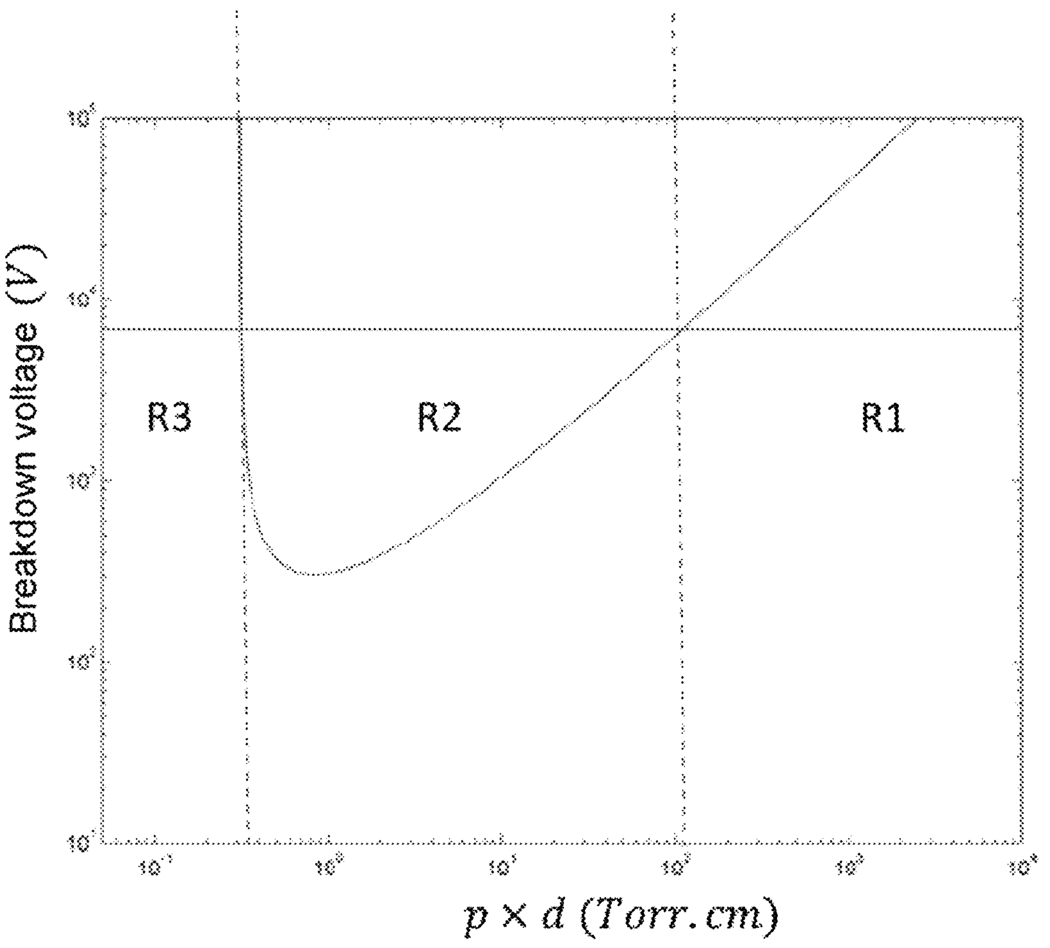
FIG. 1D shows a graphical representation of the Paschen curve in air.

FIG. 1D is a general graphical representation of the Paschen curve in air, that is to say the curve that specifies the breakdown voltage in the air for a voltage between two electrodes separated by a distance d and for a pressure p. This figure will be able to be used to clarify the operation of the connector in the atmospheric pressure regime (region R1), in the depressurization regime (region R2) and under high vacuum (region R3). In the plugged-in connector of FIG. 1C, the distance d corresponds to the shortest distance in the air between the electrical contact CE and the male external shell CM or between the electrical contact CE and the female external shell CF.

FIG. 1D shows, by way of non-limiting example, a horizontal straight line that corresponds to a predetermined operating voltage of the connector equal to 7 kV. The curve in FIG. 1D illustrates the fact that there is necessarily a range of values p×d of approximately [2.5 Torr. cm; 102 Torr. cm] (region R2) for which a breakdown is obtained in the air, for an operating voltage of 7 kV.

To the right of and below the Paschen curve (portion R1 in FIG. 1D), the air is an insulator having a breakdown voltage greater than the predetermined operating voltage. There are not enough free electrons torn away from the electrical connection CE and their mean free path is too short for them to be able to accelerate adequately between two collisions: their kinetic energy is insufficient to ionize the gas and thus create a breakdown. This regime corresponds to the desired operation of the connector 1 at atmospheric pressure.

Thus, at atmospheric pressure, it is necessary to prevent a routing between the shell CM and the contact CE passing along the surface of the block DM. As such, according to one embodiment of the invention, the male structured region is adapted so that what is called a male leakage line LM between the electrical contact and the male external shell, passing through a surface of the leakage duct that is included in the male dielectric block, has a length greater than a predetermined dielectric breakdown distance associated with the predetermined operating voltage of the connector, at atmospheric pressure. This predetermined dielectric breakdown distance corresponds to the maximum distance between two electrodes, passing through the surface of an insulator, for which the routing takes place between the two electrodes, for a given voltage and a given pressure. This dielectric breakdown distance is determined by standard rules (see for example paragraph 5.1.10 of ECSS-E-HB-20-05A).

Likewise, in order to prevent a routing between the shell CF and the contact CE, passing along the surface of the block DF, the female structured region is adapted so that what is called a female leakage line LF between the electrical contact CE and the female external shell CF, passing through a surface of the leakage duct AC that is included in the female dielectric block DF, has a length greater than the predetermined dielectric breakdown distance.

Preferably, the male leakage line and the female leakage line have a length greater than 1.2 cm, for a predetermined voltage of 7 kV, in order to prevent the occurrence of the routing phenomenon.

It is noted that the condition relating to the length of the lines LM and LF necessarily allows prevention of the occurrence of breakdown in the air at this pressure between the electrical contact CE and the male external shell CM, on the one hand, and the female external shell CF, on the other hand. This is because the breakdown in the air takes place for a voltage greater than the routing (or a shorter distance between two electrodes), and therefore if the routing is prevented, the breakdown in the air is prevented.

When the air pressure decreases, the Paschen curve (portion R2 in FIG. 1D) is intercepted and electrical discharge occurs if the connector is live. This regime corresponds to the depressurization (i.e. evacuation) of the connector, wherein the connector of the invention is not operating and is not powered up.

If the pressure continues to fall, we are then below and to the left of the Paschen curve (portion R3 in FIG. 1D). The mean free path of the electrons becomes too long this time: there are no longer enough gas atoms on their way to trigger, through collisions with said atoms, the avalanche effect that transforms the gas into plasma and produces the breakdown. This regime corresponds to the operation of the connector under high vacuum. In this regime, the high vacuum therefore serves as an insulator.

In the invention, the male region RSM and the female region RSF can exhibit any shape without departing from the scope of the invention so long as the male region RSM is capable of being inserted into the female region RSF, or vice versa, so as to create the leakage duct AC. Thus, according to the embodiment illustrated in FIG. 1C, the male region RSM is structured so as to have ridges in the plane (x, y) that are recessed compared to the rest of the dielectric block DM and the female region RSF is structured so as to have ridges in the plane (x, y) that protrude compared to the rest of the dielectric block DF. Alternatively, according to another embodiment, the female region RSF is structured so as to have ridges in the plane (x, y) that are recessed compared to the rest of the dielectric block DF and the male region RSM is structured so as to have ridges in the plane (x, y) that protrude compared to the rest of the dielectric block DM. According to another embodiment, the female region RSF and the male region RSM have a structure in the plane (x, y) that has both recesses and protruding portions compared to the rest of the dielectric block DF and DM, respectively.

Moreover, according to one embodiment of the invention, which is different from that illustrated in FIG. 1C, the regions RSM and RSF are such that their section along the plane (x, y) has structures that are not in the shape of rectangular or square ridges but that are for example in the shape of a triangle or any other shape known to those skilled in the art, so long as the male region RSM is capable of being inserted into the female region RSF, or vice versa, so as to create the leakage duct AC and allow the electrical contact CE.

Likewise, the specific shape of the recesses RF and RM is not relevant to the invention so long as the male region RSM is capable of being inserted into the female region RSF. By way of non-limiting example, the recesses RF and RM are in the shape of hollow cylinders having a square base, a circular base or a polygonal base.

In the invention, the male structured region RSM should not be in contact with the female structured region RSF without sealing the leakage duct AC. This could prevent the high vacuum from being achieved in the connector 1 and/or could disrupt the protection of the connector against electric breakdown.

Preferably, the number of openings and the dimensions of the openings are adapted according to the volume of the leakage duct, so that it is possible to obtain a high vacuum in the leakage duct (or a pressure equilibrium between the leakage duct and the outside of the connector) in a predetermined time. This predetermined time is defined by the specifications of the user and by standards related to the field of use.

Preferably, the region RSM and the region RSF have a structuring that can be used to limit the effects of projections related to their volume. Thus, preferably, the region RSM and the region RSF are such that the edges of the leakage duct are rounded.

Figure 2:
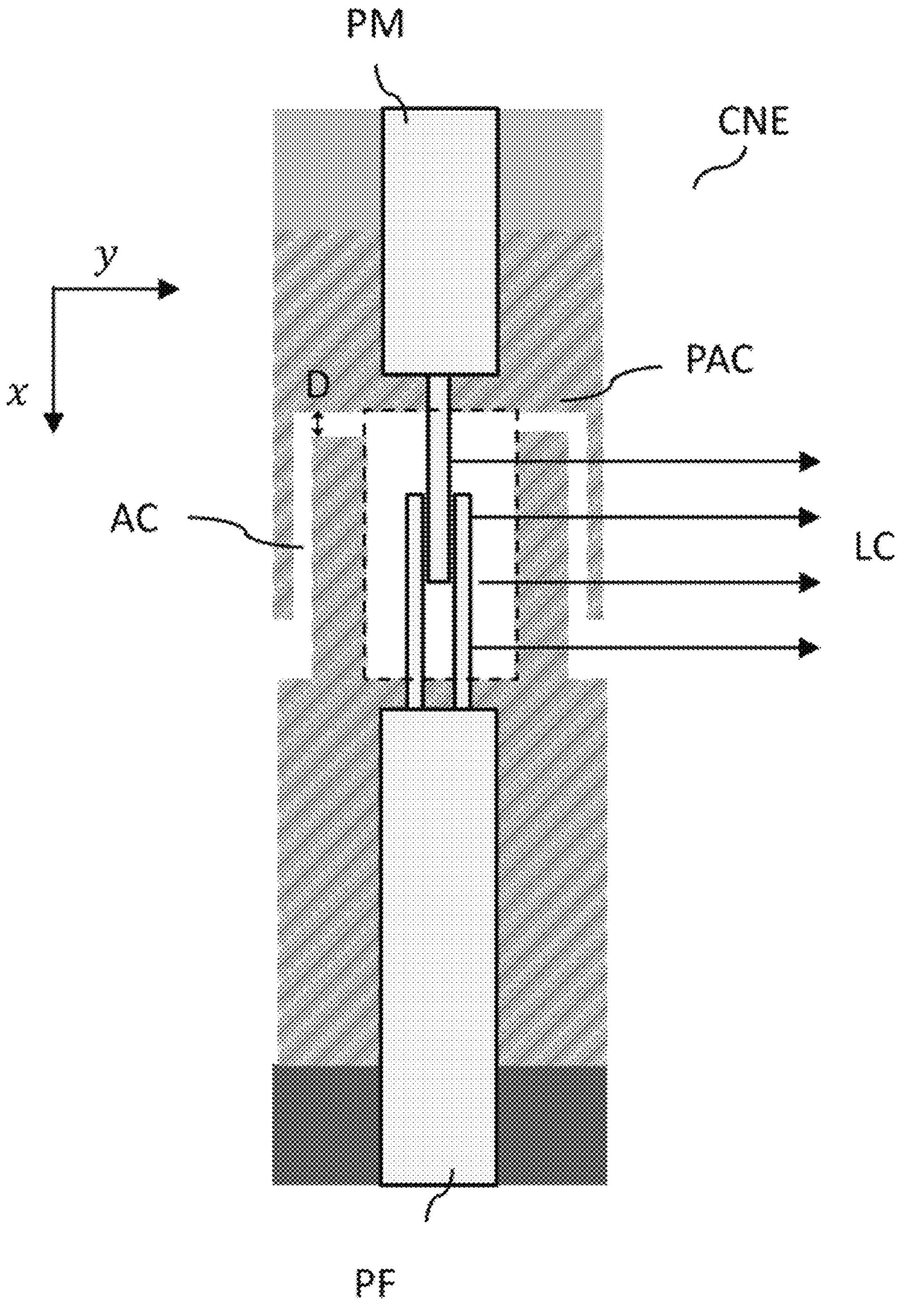
FIG. 2 shows an enlargement of the basic connector of the connector according to the invention.

FIG. 2 schematically illustrates an extension of the basic connector CNE of the connector 1. This FIG. 2 shows the portion PAC of the leakage duct AC where the electrical contact CE is arranged. D denotes the distance along a direction y perpendicular to x between the electrical contact CE and a surface of the portion of the leakage duct PAC. Moreover, the field lines LC associated with the electrical contact CE have been shown in FIG. 2. These field lines are of course dependent on the geometry of the electrical contact and represent the direction of the vector translating the remote action undergone by an electrical charge. That is to say that an electron torn away from a given point on the contact CE will follow the direction of the field line LC associated with this point.

According to a preferred embodiment of the invention, the portion of the leakage duct PAC extends in the direction x, as illustrated in FIG. 2, so that said portion is substantially perpendicular to the field lines LC associated with the contact CE, which are along the direction y in the example in FIG. 2. This feature is particularly useful for making the connector 1 resistant to an accidental rise in pressure from the high vacuum. This is because this arrangement of the duct PAC can be used to artificially limit the mean free path of the electrons torn away from the contact CE, thus preventing them from accelerating sufficiently between two collisions to ionize the gas and thus create a breakdown, because the electrons torn away in this manner will be "stopped" by the dielectric walls of the portion PAC of the duct. The key parameter controlling the mean free path of the electrons torn away is the distance D between two opposite surfaces of the leakage duct. In other words, D is the thickness of the leakage duct formed by the regions RSM and RSF. The smaller D is, the more the dielectric walls of the leakage duct are likely to limit the acceleration of the electrons torn away. As such, a rise in pressure that would be likely to move the connector from the region R3 in FIG. 1D to the region R2 and cause a breakdown does not compromise the electrical operation of the connector. It is understood that this is true only for a relatively small rise in pressure that is dependent on the predetermined operating voltage. Even more preferably, it is desirable for the connector to operate correctly for a rise in pressure of up to 1 Pa. Thus, the distance D is chosen to be short enough for there to be no electrical breakdown in the air at a pressure of 1 Pa within the leakage duct.

According to a preferred embodiment of the invention, denoted MP, the connector of the invention comprises a plurality of basic connectors CNE, for example arranged so as to form a row or a matrix. This allows the number of signals transmitted by the connector 1 to be maximized.

Figure 3:
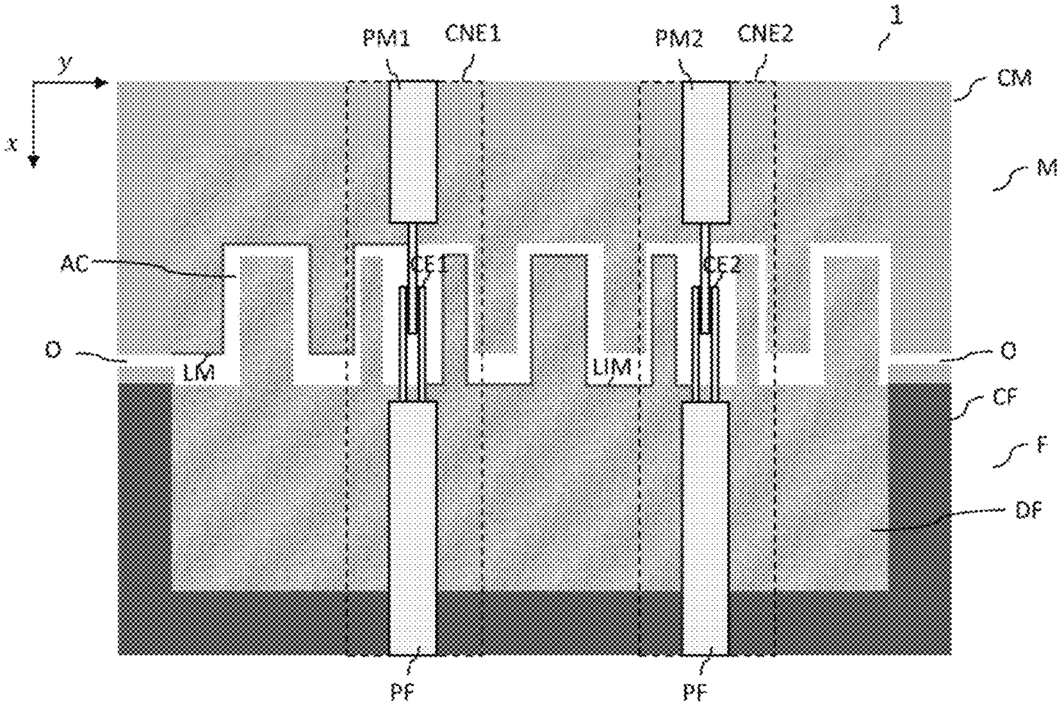
FIG. 3 shows a schematic view of the connector according to one embodiment, comprising a first basic connector and a second basic connector, which are aligned along a direction y, sharing one and the same leakage duct.

FIG. 3 schematically illustrates an example of the embodiment MP in which the connector 1 comprises a first basic connector CNE1 and a second basic connector CNE2, which are aligned along the direction y, sharing one and the same leakage duct AC. In the example in FIG. 3, it is essential that introducing two basic connectors CNE1 and CNE2 into the same duct AC does not cause any routing or any breakdown in the air. To prevent these phenomena from occurring, what is called a male intercontact leakage line LIM, between the electrical contact CE1 of the first basic connector CNE1 and the electrical contact CE2 of the second basic connector CNE2, passing through a surface of the leakage duct that is included in the male dielectric block, has a length greater than the predetermined dielectric breakdown distance. Likewise, what is called a female intercontact leakage line between the electrical contact of the first basic connector and the electrical contact of the second basic connector, passing through a surface of the leakage duct that is included in the female dielectric block, has a length greater than the predetermined dielectric breakdown distance. In this way, the connector in FIG. 3 allows a greater number of signals to be transmitted while preserving optimum electrical operation.

Figure 4:
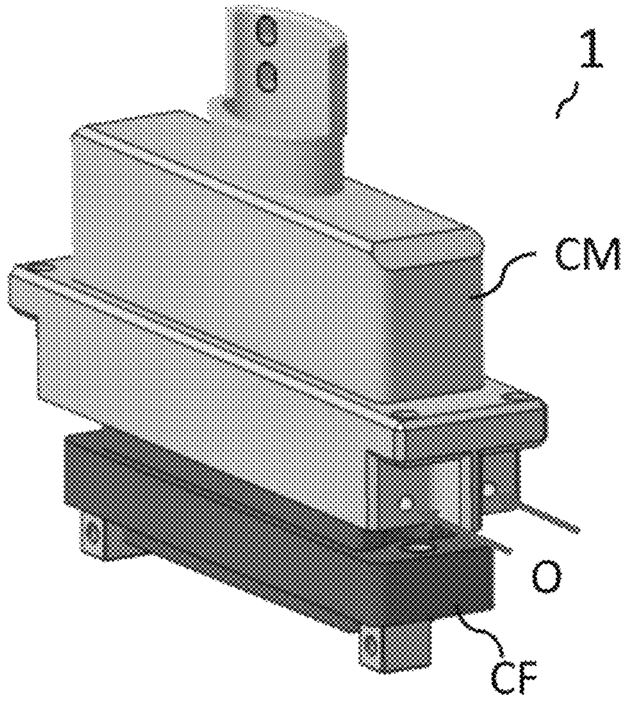
FIG. 4 shows a schematic view of the connector according to one embodiment.

FIG. 4 schematically illustrates the connector 1 according to an embodiment of the invention, with the male portion M and the female portion F plugged in. By way of non-limiting example, the male external shell CM comprises 2 openings O placed on each of the small lateral faces of the shell CM. The connector in FIG. 4 is simple, compact and allows the male portion to be easily separated from the female portion. By way of non-limiting example, the connector 1 typically has dimensions of 85×16×55 mm.

The invention claimed is:

1. A high-voltage electrical connector for space, comprising a male portion (M) and a female portion (F), to produce an electrical contact (CE),
- said male portion comprising:
  - a metallic male external shell (CM);
  - a male dielectric block (DM) encapsulated by the metallic male external shell and having a male structured region (RSM) comprising a male recess (RM);
  - a male part (PM) of the electrical contact that is at least partially embedded in the male dielectric block, said male part extending in a direction x, a male end of said male part being arranged in the male recess,
- the female portion (F) comprising:
  - a metallic female external shell (CF)
  - a female dielectric block (DF) encapsulated by the female shell and having a female structured region (RSF) comprising a female recess (RF);
  - a female part (PF) of the electrical contact that is at least partially embedded in the female dielectric block, said female part extending in the direction x, a female end (EF) of said female part being arranged in the female recess, said male end being able to interlock with said female end to create the electrical contact (CE),
  - an assembly formed by said male part, said female part, said male recess and said female recess being a basic connector (CNE),
- the metallic male external shell or the metallic female external shell having at least one opening (O), the male structured region having a shape that complements a shape of the female structured region, the male structured region being capable of being inserted into the female structured region, or vice versa, to allow the electrical contact and create a leakage duct (AC) between the female structured region and the male structured region allowing air included between the female structured region and the male structured region to flow to said at least one opening,
- the leakage duct being adapted to allow a high vacuum to be obtained in the leakage duct and to prevent, at atmospheric pressure, the occurrence of a dielectric breakdown between the electrical contact and the metallic male external shell passing over a surface of the male dielectric block, and between the electrical contact and the female metallic external shell passing over a surface of the female dielectric block.

2. The high-voltage electrical connector according to claim 1, wherein the leakage duct is the only means for the air included between the female structured region and the male structured region to flow to the outside of said connector.

3. The high-voltage electrical connector according to claim 1, wherein a portion of the leakage duct (PAC) in which the electrical contact is arranged extends in the direction x, said portion being substantially perpendicular to field lines (LC) associated with said electrical contact.

4. The high-voltage electrical connector according to claim 3, wherein a thickness of the leakage duct is small enough for there to be no electric breakdown in the air at a pressure of 1 Pa within the leakage duct.

5. The high-voltage electrical connector according to claim 1, wherein the male structured region is adapted so that a male leakage line (LM) between the electrical contact and the male external shell, passing through a surface of the leakage duct that is included in the male dielectric block, has a length greater than a predetermined dielectric breakdown distance associated with said predetermined voltage, at atmospheric pressure, and wherein the female structured region is adapted so that a female leakage line (LF) between the electrical contact and the female external shell, passing through a surface of the leakage duct that is included in the female dielectric block, has a length greater than said predetermined dielectric breakdown distance.

6. The high-voltage electrical connector according to claim 5, wherein the male leakage line has a length greater than 1.2 cm and the female leakage line has a length greater than 1.2 cm, for a predetermined voltage of 7 kV.

7. The high-voltage electrical connector according to claim 1, wherein a number of openings and dimensions of the openings are adapted according to a volume of the leakage duct, so that it is possible to obtain a high vacuum in the leakage duct in a predetermined time.

8. The high-voltage electrical connector according to claim 1, wherein the male and female recesses are in the form of hollow cylinders.

9. The high-voltage electrical connector according to claim 1, comprising a plurality of basic connectors.

10. The high-voltage electrical connector according to claim 9, wherein said basic connectors are arranged so as to form a row or a matrix.

11. The high-voltage electrical connector according to claim 10, comprising a first basic connector (CNE1) and a second basic connector (CNE2), which are aligned along a direction y perpendicular to x, sharing one and the same leakage duct, and wherein a male intercontact leakage line (LIM), between the electrical contact (CE1) of the first basic connector (CNE1) and the electrical contact (CE2) of the second basic connector (CNE2), passing through a surface of the leakage duct that is included in the male dielectric block, has a length greater than a predetermined dielectric breakdown distance, associated with the predetermined voltage, at atmospheric pressure, and wherein a female intercontact leakage line between the electrical contact of the first basic connector and the electrical contact of the second basic connector, passing through a surface of the leakage duct that is included in the female dielectric block, has a length greater than said predetermined breakdown distance.

12. A high-voltage electrical connector for space, comprising a male portion (M) and a female portion (F), to produce an electrical contact (CE), said male portion comprising:

a metallic male external shell (CM);

a male dielectric block (DM) encapsulated by the metallic male external shell and having a male structured region (RSM) comprising a male recess (RM);

a male part (PM) of the electrical contact that is at least partially embedded in the male dielectric block, said male part extending in a direction x, a male end of said male part being arranged in the male recess, the female portion (F) comprising:

a metallic female external shell (CF)

a female dielectric block (DF) encapsulated by the female shell and having a female structured region (RSF) comprising a female recess (RF);

a female part (PF) of the electrical contact that is at least partially embedded in the female dielectric block, said female part extending in the direction x, a female end (EF) of said female part being arranged in the female recess, said male end being able to interlock with said female end to create the electrical contact (CE), an assembly formed by said male part, said female part, said male recess and said female recess being a basic connector (CNE), the metallic male external shell or the metallic female external shell having at least one opening (O), the male structured region having a shape that complements a shape of the female structured region, the male structured region being capable of being inserted into the female structured region, or vice versa, to allow the electrical contact and create a leakage duct (AC) between the female structured region and the male structured region allowing air included between the female structured region and the male structured region to flow to said at least one opening, wherein the male and female structured regions have complementary ridges that are recessed and that respectively protrude compared to the rest of the respective male and female dielectric blocks.

13. The high-voltage electrical connector according to claim 12 wherein the ridges are rectangular or square ridges.

14. The high-voltage electrical connector according to claim 12 wherein the leakage duct being adapted to allow a high vacuum to be obtained in the leakage duct and to prevent, at atmospheric pressure, the occurrence of a dielectric breakdown between the electrical contact and the metallic male external shell passing over a surface of the male dielectric block, and between the electrical contact and the female metallic external shell passing over a surface of the female dielectric block.

15. The high-voltage electrical connector according to claim 14 wherein the ridges are rectangular or square ridges.

* * * * *